July 26, 1960 M. W. SIMONSEN 2,946,597
FERTILIZER MIXER AND SPREADER WITH PARTITIONED CONTAINER
Filed Sept. 18, 1957 4 Sheets-Sheet 1

Merle W. Simonsen
INVENTOR.

BY
Attorneys

July 26, 1960 M. W. SIMONSEN 2,946,597
FERTILIZER MIXER AND SPREADER WITH PARTITIONED CONTAINER
Filed Sept. 18, 1957 4 Sheets-Sheet 2

Merle W. Simonsen
INVENTOR.

BY *O'Brien*
*and Harvey B. Jackson*
Attorneys

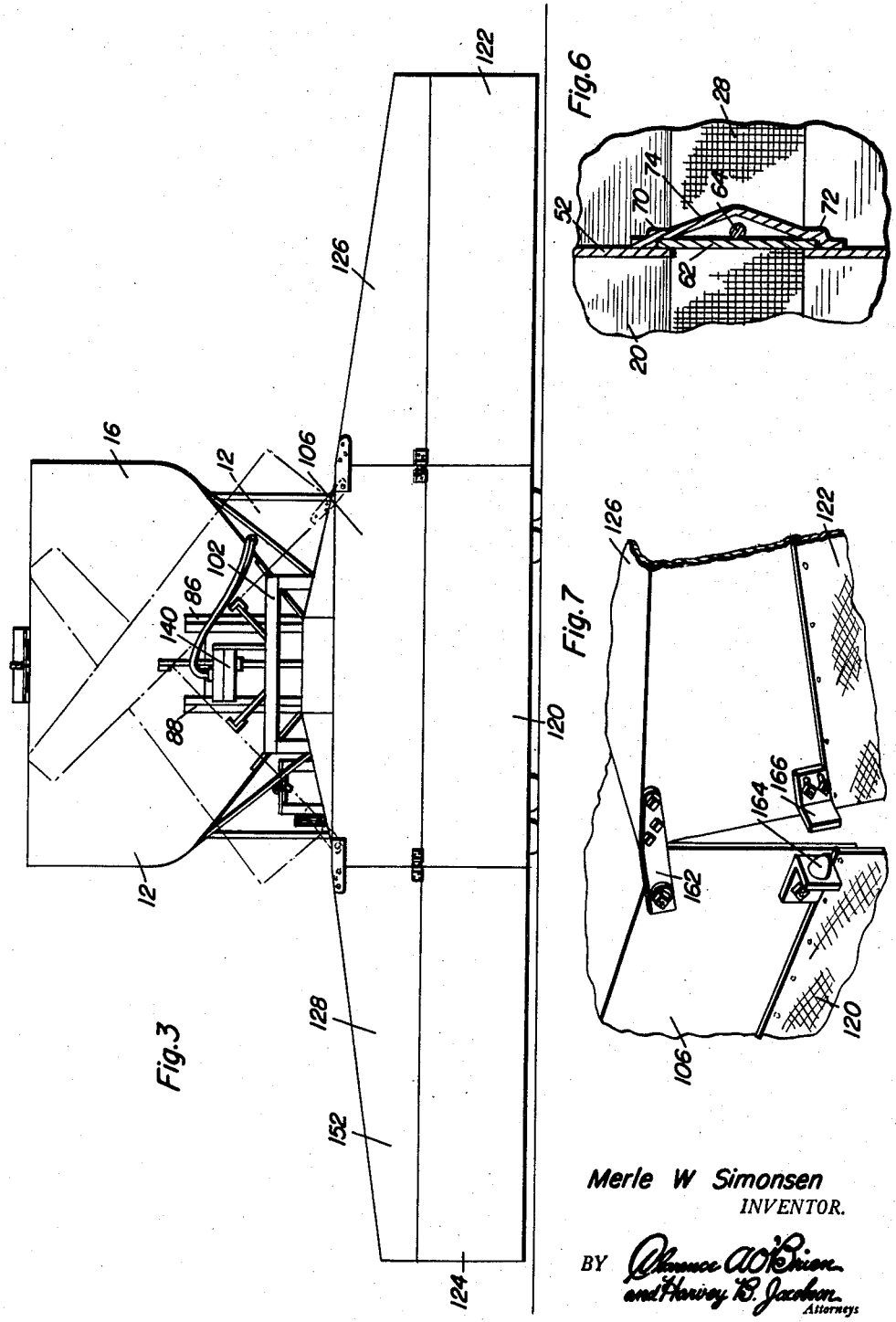

July 26, 1960     M. W. SIMONSEN     2,946,597
FERTILIZER MIXER AND SPREADER WITH PARTITIONED CONTAINER
Filed Sept. 18, 1957     4 Sheets-Sheet 4

Merle W. Simonsen
INVENTOR.
BY
Attorneys

United States Patent Office 2,946,597
Patented July 26, 1960

2,946,597

FERTILIZER MIXER AND SPREADER WITH PARTITIONED CONTAINER

Merle W. Simonsen, Quimby, Iowa

Filed Sept. 18, 1957, Ser. No. 684,807

8 Claims. (Cl. 275—8)

This invention relates to a combined fertilizer mixer and spreader with partitioned container.

An object of the invention is to provide a machine for mixing two or more different materials during the spreading operation and by means of a novel structural organization. In one embodiment of the invention there is a tank that is divided into a number of compartments. The base of the tank and hence, the base of the compartments, are of triangular structure. At the vertex bottom there is a continuous conveyor belt which passes beneath the compartments. It is assumed that each compartment is loaded with a fertilizer component and by means of metering gates, each compartment deposits material on the continuous belt in a quantity proportional to the opening of the gate. As the mixture reaches the end of the tank it is broadcast over the ground by means of an impeller.

It is a further object of the invention to provide structural improvements in the manner of handling the fertilizer components after they leave the compartments and during the distribution thereof. There is an arrangement of hoods with a backdrop, together with a fan housing that is located in the center part of the hood arrangement. The hood design is such that there is an efficient spread with a single distributor fan. With the hoods in the operative, down position the spread is limited, but with the end sections of the hoods in the inoperative raised position, the spread is considerably greater.

One of the problems that has caused considerable difficulty in fertilizer distributing equipment has been in gear boxes, power take-off drives and other mechanical movements. My invention employs a hydraulic motor to operate the impeller in that the hydraulic drive system eliminates gears and other parts that were subjected to mechanical failure in previous fertilizer distributors. It is not that the gears cannot be constructed properly or that the clutches cannot be made correctly. The problem of handling lime and its corrosive action on metals as well as careless handling of equipment is what is overcome by the hydraulic drive for the distributor. In this connection, the preferred form of the invention has many parts constructed of stainless steel or material of like-non-corrosive qualities. Particularly, the conveyor at the bottom of the tank and the gates which function as valves between the compartments in the tank are to be made of a non-corrosive material to overcome serious difficulties that are encountered.

Other objects and features of importance will become apparent in following the description of the illustrated form of the invention.

Figure 3 is a rear view of the truck in Figure 1.

Figure 6 is an enlarged horizontal sectional view taken on the line 6—6 of Figure 4 and showing a detail of one of the gates between compartments in the tank; and, Figure 7 is an enlarged perspective view showing one of the rubber shocks to reduce cracking and breaking and the need for bracing at the junction of the center section and one of the end sections of the hood at the rear of the truck.

Figure 2:
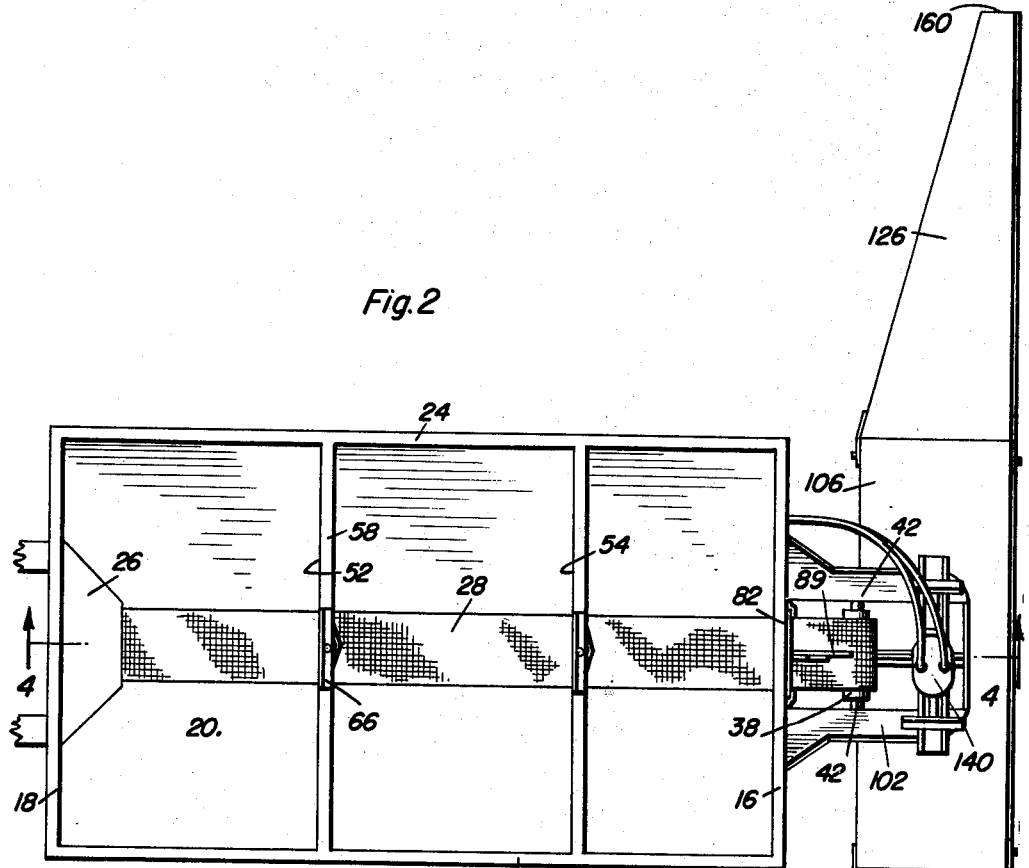
Figure 2 is a top view of the container or tank part of the truck with the hoods extended.
Figure 5:
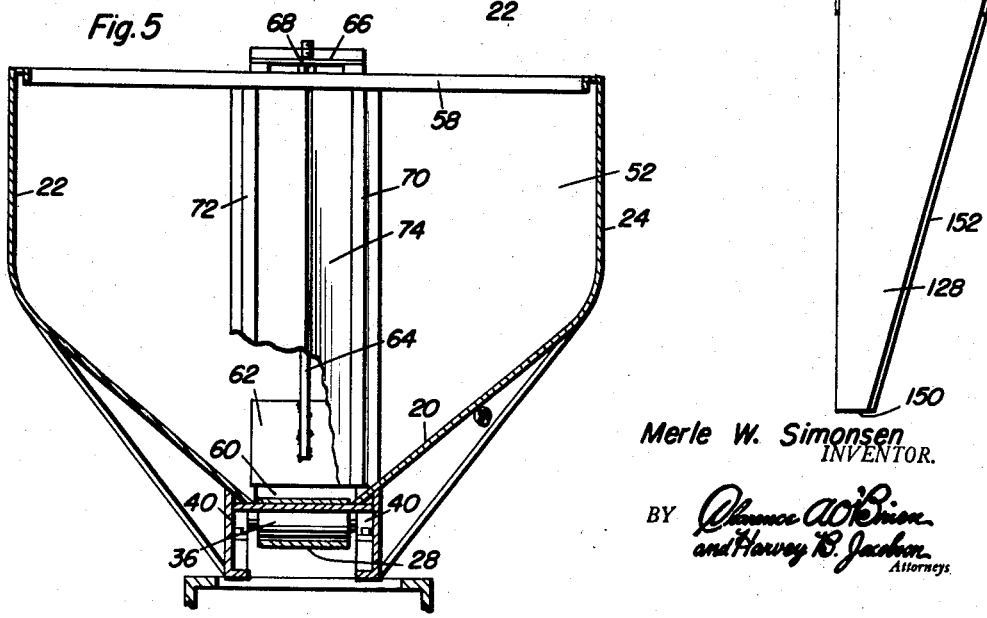
Figure 5 is a transverse sectional view of the tank and taken approximately on the line 5—5 of Figure 4.
Figure 4:
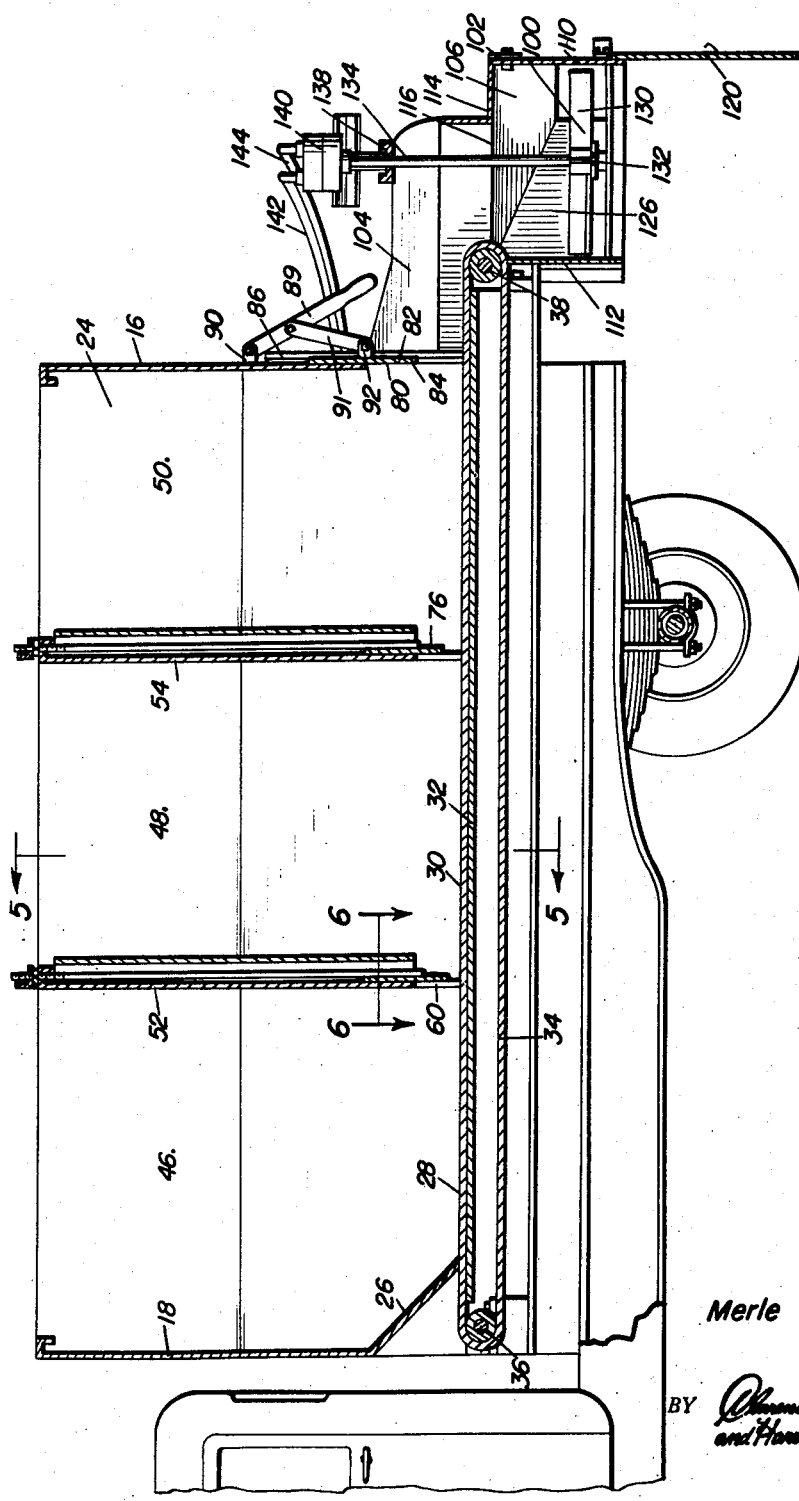
Figure 4 is a longitudinal sectional view taken on the line 4—4 of Figure 2.

In the drawings there is a truck 10 that has a bed 12 on which container or tank 14 is mounted. The tank has end walls 16 and 18, a trough-shaped bottom 20 together with side walls 22 and 24. Baffle 26 is attached to the end wall 18 and is inclined or tilted to deflect the material in the tank toward the longitudinal center line of the bottom 20 of the tank. Endless conveyor 28, see Figure 4, is located at the bottom 20 of the tank and has the upper flight 30 disposed on floor panel 32 with the lower flight 34 below this panel. Front and rear rollers 36 and 38 are mounted in front bearings 40, Figure 5, and rear bearings 42, Figure 2, respectively at the fore and aft parts of the tank. Accordingly, the upper flight 30 of the conveyor functions as the bottom of the tank.

The tank is sectioned into three compartments 46, 48 and 50, these being representative of any number of compartments from two to the largest practical number. Partitions 52 and 54 that extend across the sides 22 and 24 of the tank, separate the tank into the compartments 46, 48 and 50. Partition 52 has a reinforcing member 58 at its upper edge and is attached to the inner surfaces of the sides and bottom of the tank. A lower central opening 60 directly above conveyor 28, is formed in the partition 52 to enable material in compartment 46 to be propelled by conveyor 28 toward the discharge end of the tank. Gate 62 is movable vertically across opening 60 to regulate the effective area of the opening and this is manually controlled. Rod 64 is fixed to the gate or valve plate 62 and passes through aligned openings in the member 58 and the support 66 that is attached thereto. The upper end of rod 64 is threaded, and nut 68 is held captive between the confronting spaced surfaces of support 66 and member 58. When the nut 68 is rotated, the rod 64 is raised and lowered in accordance with the direction of rotation of nut 68. A pair of rails 70 and 72 are provided which form a track at the edges of cover plate 74 and in which the opposite edges of the valve plate 68 are slidable. The track holds the valve plate captive, constraining its motion to that which will open or close the opening 60 in the desired, selected amounts.

Partition 54 is fashioned identically to partition 52 that has been described in detail. There is a valve port 76 formed as an opening in the bottom of the partition directly above the endless conveyor 28 and controlled by a gate or valve plate. The adjustment of the valve plate is the same in this instance as described in connection with partition 52. The compartments 46, 48 and 50 may be of any sizes depending on the location of the partition. For some jobs where a much greater proportion of one fertilizer ingredient in comparison to another fertilizer ingredient will ordinarily be used, the compartments may be sized accordingly. Otherwise, the compartments may be approximately the same in volumetric capacity.

End wall 16 which is at the discharge end of the tank has a discharge opening 80 at its lower edge and which opens directly over the upper flight of the endless conveyor. The gate 82 that controls the issuance of material through opening 80 is in the form of a plate valve 84 whose opposite edges are slidable in rails 86 and 88 that are welded or otherwise attached onto the outer surface of the end wall 16. Lever 89 pivoted at its upper end on a mounting bracket 90 at the back of the tank, has a pitman 91 pivoted to it and to an ear 92 on the plate 84. Upon raising or lowering the lever 89 the gate 82 will be opened a corresponding distance. A holddown bolt may be used to hold the gate 82 in the selected position.

One of the important features of this invention is the impeller 100 for the fertilizer. Frame 102 is attached to the rear end of the bed of the truck. A hopper 104 is carried by frame 102 and has the discharge end of conveyor 28 in registry with it. As the material is moved by conveyor 28 it spills into hopper 104 that is constructed of sides and an end wall attached to frame 102. A fan or impeller casing 106 is carried by frame 102 and is fed with material from the hopper. The fan case may be considered as a part of hopper 104 in that the walls of the hopper form upwardly extending continuations of the side walls of the impeller casing.

As viewed in Figure 3, the impeller casing 106 also constitutes the center section of a hood. As such it has a back wall (Figure 4) 110, a front wall 112 parallel to the back wall, and a top wall 114 that has an opening 116 in registry with the hopper and through which the material from the endless conveyor 28 is passed. Backdrop 120 in the form of a flat panel, is separably attached to the back wall 110 so that the distributed material will be required to take a fixed path of movement to form a definite pattern when broadcast by impeller 100. The backdrop is a rectangular panel as are backdrops 122 and 124 for the two end sections 126 and 128 of the hood.

Impeller 100 consists of a paddle wheel that has a plurality of flat paddles 130 emanating from a hub 132. The hub is secured to a drive shaft 134 that extends upwardly through the center section of the hood and through bearings 138 in a part of the frame 102. Hydraulic motor 140 is coupled to the shaft 134 in order to rotate the shaft in response to the demand thereon made by a control system (unshown). Hydraulic lines 142 and 144 are attached to the hydraulic motor 140 and to a source of fluid under pressure which is a part of the truck hydraulic system or which is separate equipment built in especially for the operation of pump 140.

Hood section 126 has a top wall which slopes downwardly toward an open discharge end 160. The rear wall of hood 126 is formed as a continuation of the rear wall 110 of the center section of the hood. The front wall of the hood section 126 is tapered downwardly and rearwardly, and backdrop 122 is attached to its lower edge. Hood 126 is a mirror image of hood 128 so that its front wall forms a substantial continuation of the front wall of the center section of the hood and fan casing while the back wall 152 of hood 128 is tapered inwardly and downwardly as it approaches the open discharge end 150 of that hood section.

The two hood sections are connected at their upper edges by hinges, a typical hinge 162 is shown in Figure 7. This view shows also that the backdrops are flexible panels to avoid damage should any obstructions be encountered. The two lateral sections of the hood are foldable to an elevated, crossed position (Figure 3) when they are inoperative. The inoperativeness may center about a total non-use of the fertilizer mixer and distributor such as when moving the truck from one place to another or may refer to broadcasting without the restriction imposed on the pattern by the lateral sections of the hood. Cushions in the form of rubber bumpers 164 are carried by brackets on the center section rear wall of the hood and they are engaged by stops 166 that are carried by the rear walls of the end sections 128 and 126. Stops 166 are adjustably mounted, as by bolt and nut assemblies connected through slots on the stops. The cushions 164 are of importance since they reduce cracking and breaking and the need for bracing at these points. The other parts are easily and cheaply replaced. In addition, note that hinge 162 is exceedingly simple, consisting of a strap that is fixed to one of the hood sections and pivoted on a bolt or pivot pin on the other section. These hinges are non-binding but yet are sufficiently strong to carry any loads that are ordinarily imposed on the hood.

Figure 1:
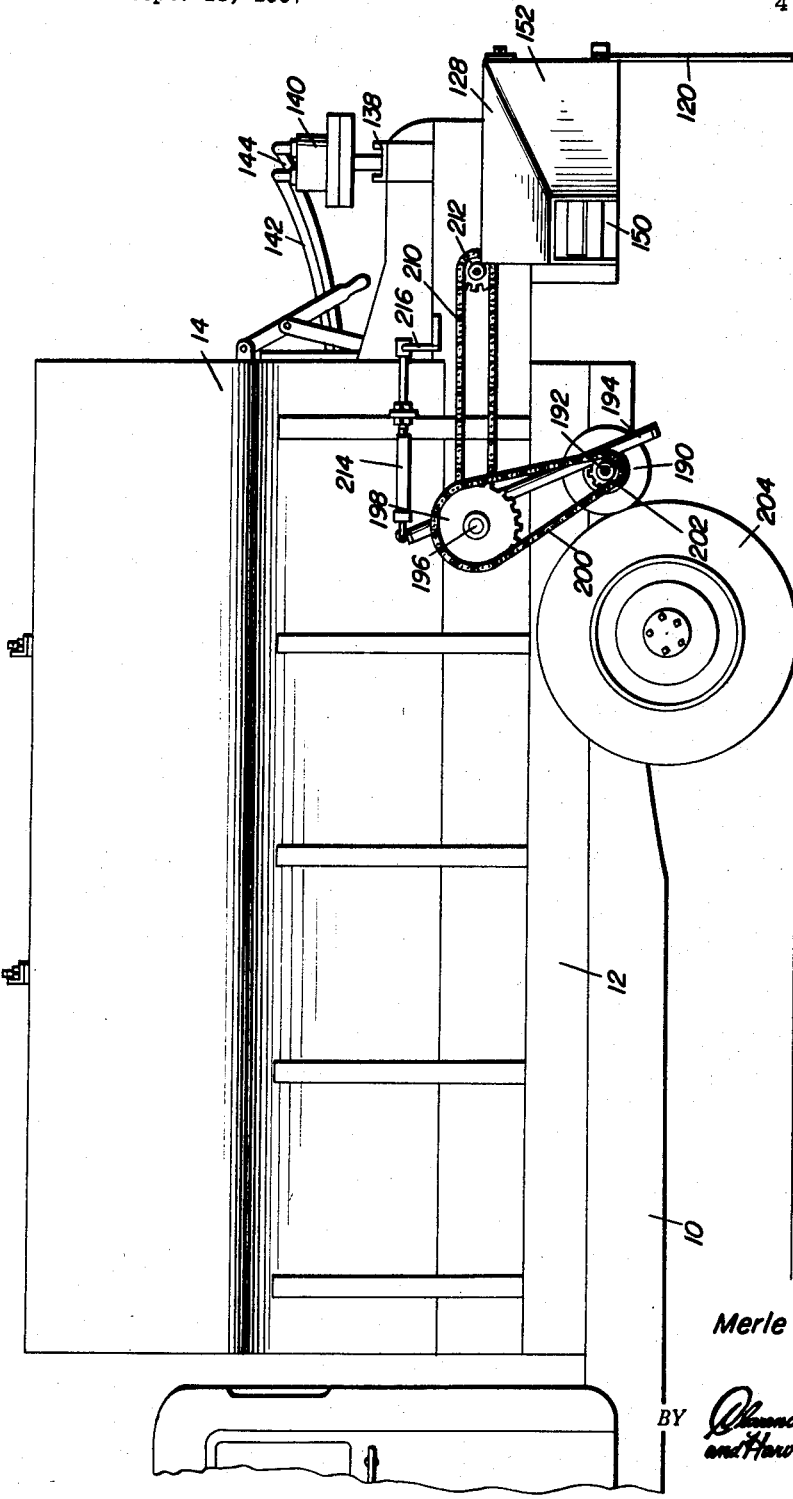
Figure 1 is an elevational view of a typical truck equipped in a manner to practice the principles of the invention.

In use of the machine, power for the endless conveyor can be derived from a number of sources, one of which is shown in Figure 1. It is clearly understood that the conveyor may be operated by a power take-off from the transmission of the truck or by a separate motor or by other sources of power. However, the illustrated drive is mechanically simple and effective, relating the speed of the conveyor to the forward progress of the motor vehicle. The illustrated means consist of a wheel 190 which is mounted for rotation on a spindle 192 carried by arm 194. The arm is pivoted to a frame carried by the truck intermediate its ends so that it functions as a lever with the axis of pivotal movement of the arm being coincident with the axis of rotation of spindle 196. Sprocket 198 is attached to spindle 196 and there is a chain 200 entrained around a sprocket. The chain is also entrained around sprocket 202 which is fixed to spindle 192. Inasmuch as the wheel 190 is in contact with the tread of the tire on the truck wheel 204, forward progress of the motor vehicle will result in rotation of wheel 190 which results in further rotation of sprocket 198. An additional sprocket is attached to spindle 196 and has chain 210 entrained around it. This chain is also entrained around sprocket 212 that is fixed to the rear roller 38. The result is that as spindle 196 rotates the endless conveyor is actuated.

Jack 214 is carried by a part of the truck and is pivotally connected to an end of arm 194. When the handle 216 of the jack is rotated, the pivotal position of the arm is adjusted so that wheel 190 may be moved to the drive and non-drive positions.

The fertilizer ingredients are placed in the compartments and the gates opened to the desired setting which corresponds to the correct proportioning of the fertilizer ingredients. Then the hood sections are placed in the operative position (Figure 3) and the truck set into operation. As the truck moves forward the conveyor is actuated extracting a fertilizer component from compartment 46, another component from compartment 48 and a final component from compartment 50. These are admixed as they are conveyed by intermingling, and the commingled ingredients are fed to the hopper at the rear of the tank and into the fan casing. This fan casing functions as the center section of the hood and is in lateral registry with the casing sections at its ends. Therefore the fertilizer becomes further mixed as the impeller drives it along the length of the hood for deposit in a pattern behind the vehicle while it is moving forward at a reasonable rate.

It is understood that various changes and modifications may be made in the invention without departing from the scope of the following claims.

What is claimed as new is as follows:

1. A combined fertilizer mixer and spreader comprising a tank which has at least one vertically extending partition extending transversely of said tank and that separates said tank into a plurality of longitudinally spaced compartments, said partition having an upwardly extending opening at its bottom, an endless conveyor constituting the bottom of the compartments and located beneath said opening, a gate slidably mounted and guided upon said partition to control the effective area of said opening, means for adjusting said gate and retaining said gate in the selected adjusted position, said tank having an opening at its discharge end through which said conveyor extends, means carried by the tank for controlling said opening in said discharge end of said tank, a hopper at said discharge end of said tank and in registry with the discharge end of said conveyor, a hood that has side walls constituting an opened bottom casing, an impeller which includes a paddle wheel mounted in said casing and disposed in registry with the hopper so that the material that is extracted from said compartment by said conveyor is delivered from the discharge end of said conveyor into said hopper and onto said paddle wheel for distribution through the open bottom of said casing, means connected to said conveyor for driving the same at a speed proportionate to the speed of said tank over the ground.

2. The combination of claim 1 including, side sections on said casing and coacting with said casing to constitute a hood, and a flexible backdrop connected with said hood.

3. The combination of claim 1 including, side sections on said casing and coacting with said casing to constitute a hood, a flexible backdrop connected with said hood, hinges connecting said lateral sections of said hood to the center section, and means including flexible bumpers that constitute shock arresters between said lateral sections and said center section of said hood to absorb the shock during opening of the hood and during operation of the combined mixer and distributor.

4. The combined fertilizer mixer and distributor of clam 1 wherein there is a hydraulic motor, means mounting said hydraulic motor at the aft end of the tank, a shaft driven by said hydraulic motor and constituting a part of said impeller, and means for conducting fluid under pressure to said hydraulic motor to actuate said motor which constitutes the sole means to operate said impeller.

5. A machine for distributing granular material comprising a tank, vertically extending partitions disposed transversely in said tank to separate said tanks into a plurality of longitudinally displaced compartments, an endless conveyor at the bottoms of said compartments, said partitions having vertically upwardly extending openings at the lower ends thereof and through which said endless conveyor passes, gates slidably and guidably mounted for vertical movement on said partitions, manually operable means to adjust the vertical positions of said gates, a frame at the discharge end of said conveyor, a hopper carried by said frame, a hood registered with said hopper and into which the discharge end of said conveyor opens, said hood having an open bottom together with a top wall and side walls, a flexible backdrop carried by said back wall, an impeller in said hood onto which the material discharged from said conveyor drops for distribution by said impeller within the confines of said hood and to drop through the open bottom of said hood, and means connected with said impeller for actuating said impeller.

6. A machine for distributing granular material comprising a tank, transverse partitions in said tank to separate said tanks into a plurality of longitudinally spaced compartments, an endless conveyor at the bottoms of said compartments, said partitions having openings at the lower ends thereof and through which said endless conveyor passes, gates slidably and guidingly mounted each on a partition, manually operable means to adjust the positions of said gates, a frame at the discharge end of said conveyor, a hopper carried by said frame, a hood registered with said hopper and into which the discharge end of said conveyor opens, said hood having an open bottom together with a top wall and side walls, a flexible backdrop carried by said back wall, an impeller in said hood rotatable about a vertical axis and onto which the material discharged from said conveyor drops for distribution by said impeller within the confines of said hood and to drop through the open bottom of said hood, means including a hydraulic motor mounted upon said frame and connected with said impeller for actuating said impeller, means responsive to the forward progress of the motor vehicle on which said tank is mounted and drivingly connected to a wheel thereof for actuating said conveyor at a speed corresponding to the vehicle speed, control means for selectively engaging and disengaging said last mentioned means from said wheel.

7. A machine for distributing granular material comprising a tank, transverse partitions in said tank to separate said tanks into a plurality of longitudinally spaced compartments, an endless conveyor disposed longitudinally and medially of said tank at the bottom of said compartments, said partitions having openings at the lower ends thereof and through which said endless conveyor passes, gates slidably mounted each on one of said partitions and controlling said openings, manually operable means to adjust the positions of said gates, a frame at the discharge end of said conveyor, a hopper carried by said frame, a hood registered with said hopper and into which the discharge end of said conveyor opens, said hood having an open bottom together with a top wall and side walls, a flexible backdrop carried by said back wall, an impeller in said hood onto which the material discharged from said conveyor drops for distribution by said impeller within the confines of said hood and to drop through the open bottom of said hood, means connected with said impeller for actuating said impeller, means responsive to the forward progress of the motor vehicle on which said tank is mounted for actuating said conveyor at a speed corresponding to the vehicle speed, said hood having hood sections at the ends thereof which are hinged to said hood and are foldable into a position above said hood, and means retaining said sections in an approximately horizontal position as extensions and continuations of said hood.

8. The combination of claim 3 wherein said side sections each include a top wall and side walls which form continuations of the top and side walls of said center section, said hinges being secured between said center and side sections adjacent the top walls thereof to pivotally mount each of said side sections to said center section for movement about a substantially horizontal axis, said side sections being movable between an upstanding operational position and a horizontally disposed operational position with the adjacent ends of the corresponding side walls of said center and side sections in aligned abutting relation, a resilient stop bumper secured to the lower portion of one of said corresponding side walls, and a stop element secured to the lower portion of the other of said corresponding side walls, whereby said side sections may be resiliently supported when in the horizontally disposed operational position to reduce the occurrence of fatigue in any of the parts pivotally mounting the side sections to the center section.

References Cited in the file of this patent

UNITED STATES PATENTS

| | | |
|---|---|---|
| 416,950 | Ransome | Dec. 10, 1889 |
| 964,512 | Handle | July 19, 1910 |
| 2,275,799 | Oklejas | Mar. 10, 1942 |
| 2,281,212 | Stoltzfus | Apr. 28, 1942 |
| 2,589,988 | Bruno | Mar. 18, 1952 |
| 2,784,974 | Jones | Mar. 12, 1957 |
| 2,798,726 | Bottlander | July 9, 1957 |
| 2,799,510 | Schmidt | July 16, 1957 |
| 2,804,308 | Neighbour et al. | Aug. 27, 1957 |
| 2,805,863 | Klostermann | Sept. 10, 1957 |

FOREIGN PATENTS

| | | |
|---|---|---|
| 694,198 | Great Britain | July 15, 1953 |